April 22, 1930.  W. E. CAVADAS  1,755,593

MOTOR CYCLE VENDING SIDE CAR

Filed Nov. 28, 1928  4 Sheets-Sheet 1

Inventor
WILLIAM E. CAVADAS
By his Attorneys
Bohleber + Ledbetter

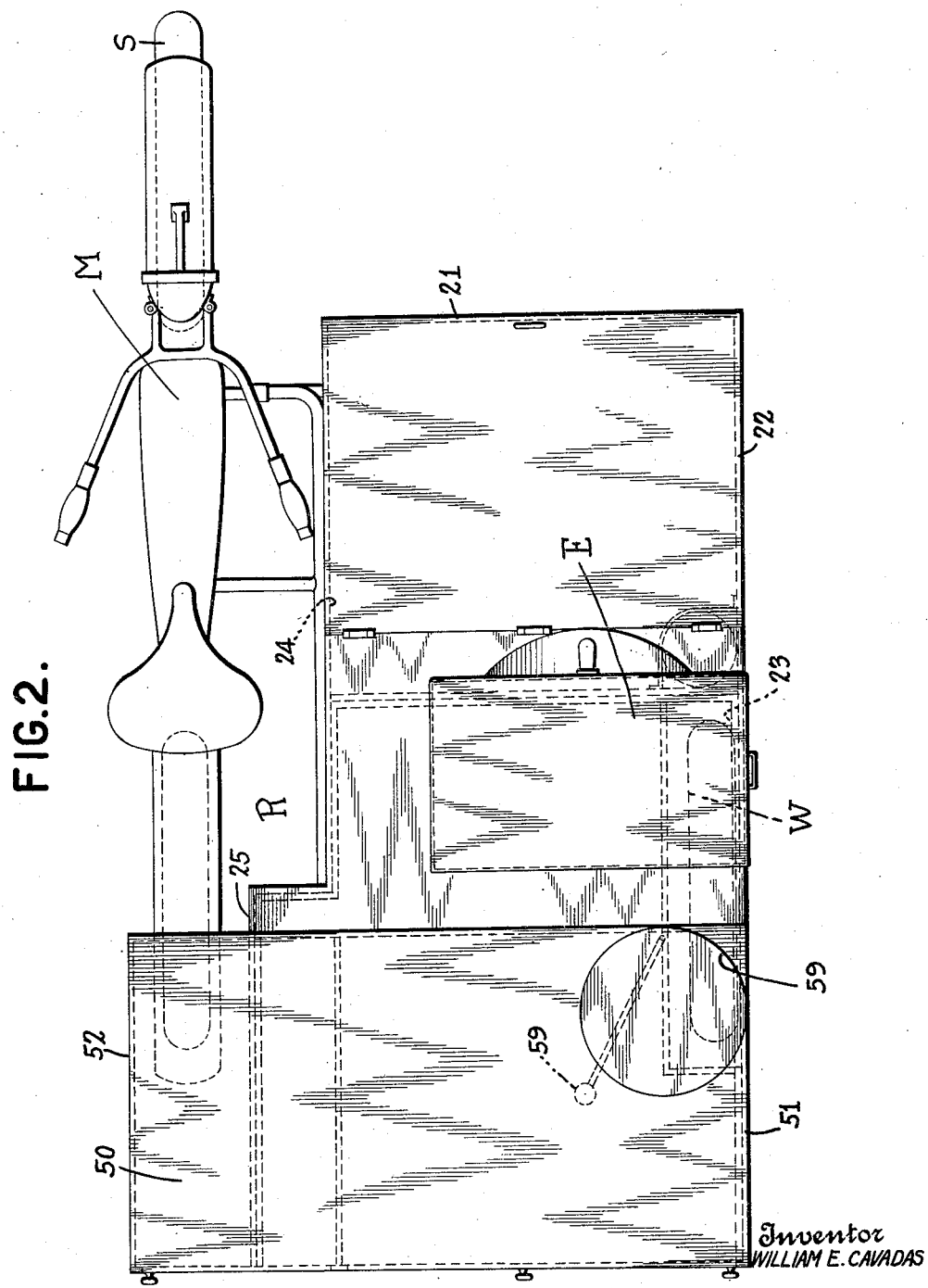

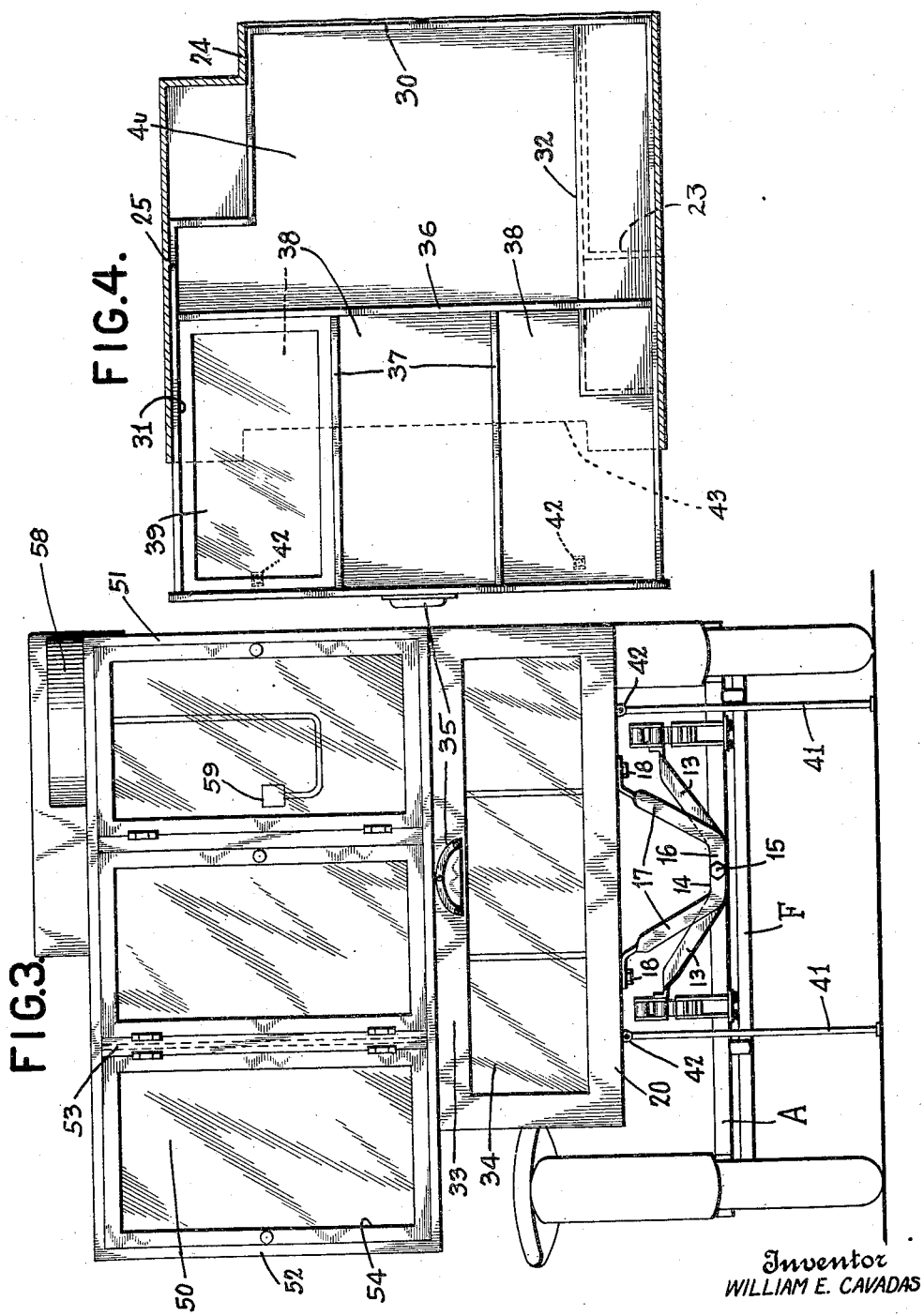

April 22, 1930.  W. E. CAVADAS  1,755,593
MOTOR CYCLE VENDING SIDE CAR
Filed Nov. 28, 1928    4 Sheets-Sheet 4
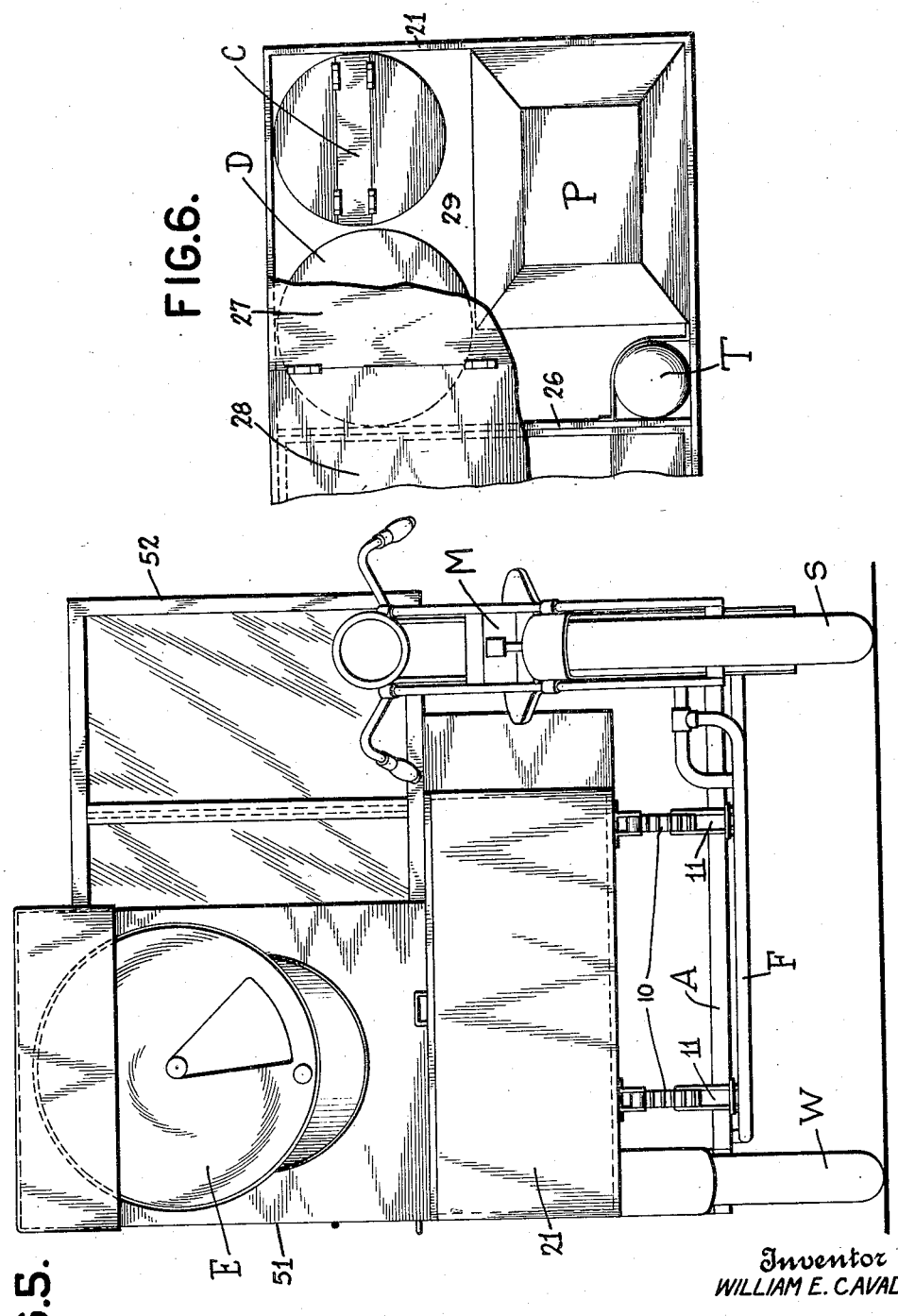
Inventor
WILLIAM E. CAVADAS
By his Attorneys
Bohleber & Ledbetter Patented Apr. 22, 1930

1,755,593

UNITED STATES PATENT OFFICE

WILLIAM E. CAVADAS, OF NEW YORK, N. Y.

MOTOR-CYCLE VENDING SIDE CAR

Application filed November 28, 1928. Serial No. 322,315.

This invention relates to vending devices of the kind adapted to be propelled from place to place and to carry and display a plurality of different articles for sale. More particularly, the invention relates to a vending vehicle which is self-propelled, that is, is provided with a prime mover as the source of propulsive power.

One object of the present invention is the provision of a vending vehicle which shall be economical from the standpoint of transportation although capable of attaining a high rate of speed in moving from one place of business to another. Accordingly a motorcycle is availed of for propulsion of the vehicle and the goods are displayed upon a supplemental conveyance which shall be referred to, for the sake of brevity, as a "side car" although a "side car", as understood, is modified to permit the use of display cabinets and other accessories.

The invention also seeks to prevent the swaying of the display devices when the conveyance is in motion. To this end suitable stabilizing devices are interposed between the springs and the body.

A further object of the invention is the provision of display cabinets or show cases which may be compactly stored while in transit but which are easily movable to operative or vending position when the vehicle is at rest and the goods are to be displayed for sale. To this end, display cabinets are adapted to telescope within the body of the vehicle when not in use. Thus the weight is concentrated and confined within a small compass when the vehicle is in motion.

These and other objects of the invention and the means for their attainment will be more apparent from the following detailed description, taken in connection with the accompanying drawings illustrating one modification by which the invention may be realized, and in which:

Figure 2 is a plan view of the vehicle.

Figure 3 shows the vehicle in rear elevation.

Figure 4 shows one of the telescoping display cabinets in partly open position.

Figure 5 shows the vehicle in front elevation.

Figure 6 is a fragmentary plan view of the front end of the vehicle, parts being broken away in the interest of clearness.

Figure 1:
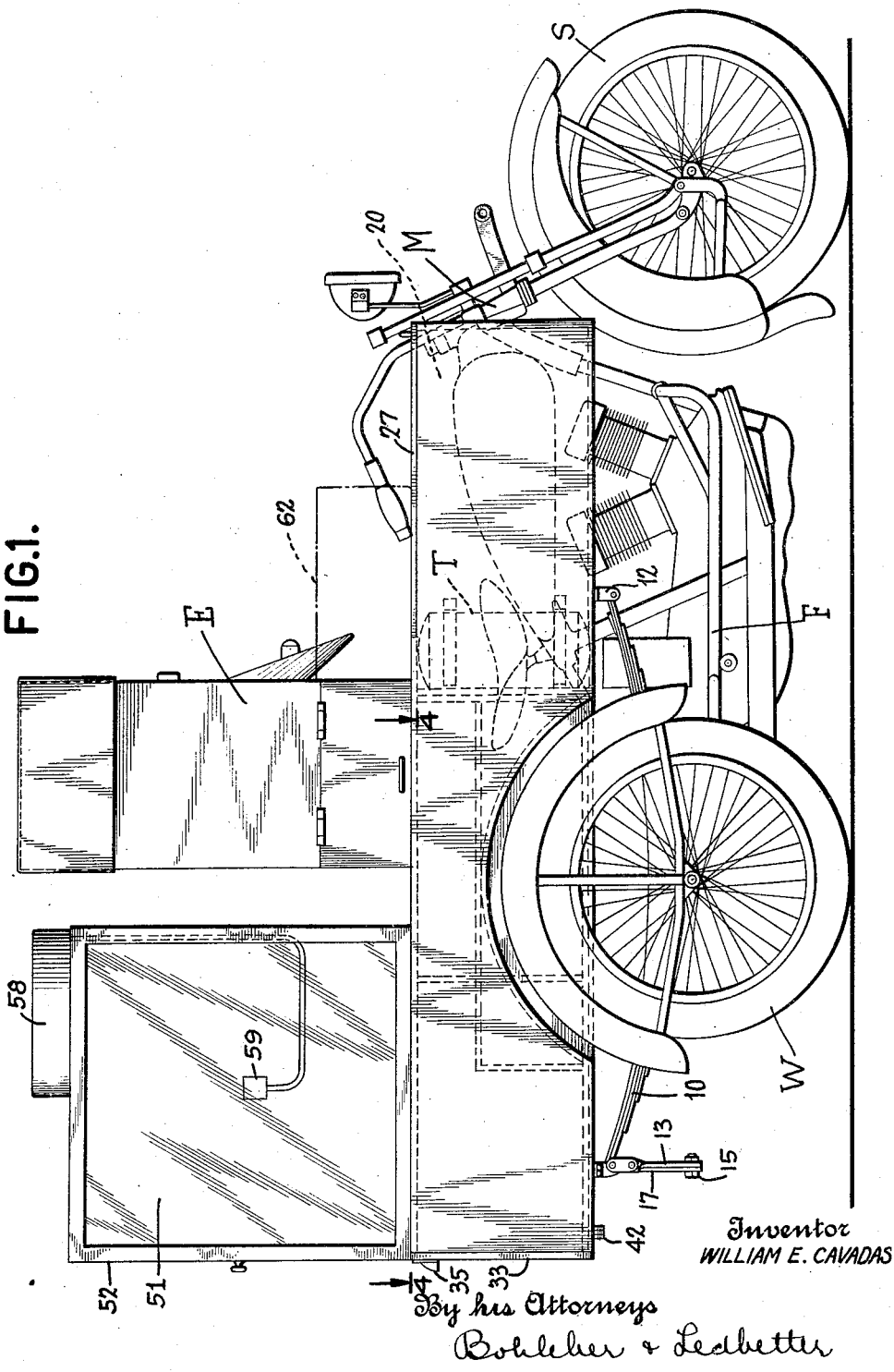
Figure 1 is a view, in side elevation, showing the vending vehicle in transportable condition.

The propelling element of the vending vehicle takes the form of the ordinary motorcycle which is indicated as a whole at M. The display cases and accessory devices are carried upon what is termed, for the sake of convenience, a side car element. This side car element includes, in part, recognized structural features of side cars, such as the third wheel W which carries the transverse axle A and a frame F joining the axle A proximate the third wheel W and extending forwardly to the frame of the motorcycle M proximate the steering wheel S" thereof. The usual side car springs are replaced by heavier and longer springs 10 extending in the longitudinal direction of the vehicle and carried upon any convenient spring seats 11 mounted upon the transverse axle A. The body 20 of the side car or superstructure is carried directly upon the springs. The springs are connected to the body 20 by spring shackles 12 at their forward ends, the body extending considerably beyond the ends of the springs and to about the transverse plane of the motorcycle steering devices. Rearwardly, the spring ends are connected respectively by shackles to a stabilizing device formed, in part, by transverse means such as a yoke member 13, 14 which is bent downwardly from each end, as at 13, to a longitudinally extending central portion 14 disposed normally and preferably in about the plane of the axle A. The horizontal portion 14 of this yoke member 13, 14 is connected at its center by the pivotal connection 15 with the horizontal portion 16 of a bracket, having arms 17 extending upwardly and outwardly to be secured at spaced points 18 to the body 20 near its rear edge. Thus, as the running gear weaves in traveling over an uneven roadway, the body or superstructure is enabled to maintain its equilibrium through the pivot 15 even though there is vertical angular movement of the axle A.

The body proper is of generally box like form having a front end wall 21 (Fig. 2) and a continuous outer or "off" side wall 22 which is recessed, as at 23, to receive the wheel W. Behind the motor cycle foot rests, that is, within the space R, the rearward portion of the near side wall 24 of the body 20, is offset or extended, as at 25, to utilize the available space adjacent the rear wheel of the motorcycle.

The front portion of the box may be formed into a compartment 29 by a transverse partition 26 and may be provided with a cover 27 hinged conveniently along the rear to the immovable top 28 of the body. This front compartment 29 may be used for storage or for various appliances, the complete display of which is not essential. As shown in Figure 6 it is provided with a peanut roaster P, a tub D for ice and bottles of cold drinks, a two part container C, wherein sauerkraut and frankfurters may be carried and a tank T" for fuel, say, for a pop corn roaster E subsequently to be mentioned.

The body 20 has an open rear end and is provided with a disappearing or telescoping show case 30. For the sake of compactness in transit and to confine the weight of the vehicle as much as possible over the springs this show case 30 is adapted to be pushed into the rear part of the body when not in use.

As shown in Figures 2 and 4 the show case 30 is of the same general shape as the rear part of the body 20 being enlarged, as at 31, to fit within the offset part 25 of the body 20 and being recessed, as at 32, at its lower outside corner to pass the recess 23 formed in the body 20. The rear wall of the show case is transparent, being formed by a frame 33 having glass 34 therein so that the contents of the show case is visible even when the show case is telescoped within the body. The frame may conveniently have a handle 35 by which the show case may be drawn outwardly out of the body for display and access when the vehicle is parked. The show case 30 proper is defined by a front transverse wall 36 and may be subdivided by partitions 37. Each subcompartment 38 may have a transparent cover, such as the glass door 39 seen in Figure 4. The space 40 in the show case forwardly of the transverse wall 36 may be used for storage space, it being contemplated that the show case be ordinarily not withdrawn beyond the transverse wall 36, and this storage compartment further serves as a counter-balancing portion to support the show case in its extended position. As an added support, the show case may be provided therebeneath with legs 41 pivotally mounted on the bottom of the show case and conveniently folded up when not in use beneath the bottom in rear of the stabilizing devices 13—17.

When the show case 30 is telescoped within the body 20, the pivotal connections 42 of the legs 41 may slide within a cutaway portion 43 formed in the bottom of the body 20.

A stationary show case 50 may be mounted upon the rear of the body 20 and have its off or outer side wall 51 flush with the off wall 22 of the body 20 while its near wall 52 may overhang the rear wheel of the motorcycle to utilize all available space. This show case extends no further forwardly, preferably, than the axle A and this portion of increased height, which would have a tendency to sway is compensated by the stabilizing devices 13—17. The side wall of this show case may be of glass and the rear wall 53 composed of a plurality of glass doors 54 so that the interior of the show case is easily accessible and the contents visible. There is illustrated a fuel tank 58 on the top of show case 50 adapted to feed fuel to burner 59 therewithin, whereby the show case is illuminated, and sufficient light obtained to illuminate the show case 30 when withdrawn for display. In front of the show case 50 and upon the top 28 of the body there may be mounted a corn popper E. A cover in the form of a pan is adapted to telescope over the top of the corn popper when not in use but may be removed and placed on the top 27 as shown in dotted lines at 62 to receive the pop corn ejected from the popper E. The top 27 forms a convenient support for the pan 62.

It will thus be seen that a vending vehicle has been provided which is easily and economically transported and parked for business by the roadside. Every element necessary to the conduct of a business of this nature is provided in a compact and convenient form and when the vehicle is in transit the show cases are arranged with a maximum of sprung weight, although the show cases may be opened out for proper display of the merchandise when ready for business. It is further to be noted that swaying of the vehicle is avoided by the use of novel and effective counter-balancing devices in spite of the relatively great height of the vehicle.

Various modifications will occur to those skilled in the art in the configuration and disposition of the component elements going to make up the vending vehicle as a whole and no limitation is intended by the phraseology of the foregoing description or illustrations in the accompanying drawings except as illustrated in the appended claims.

I claim—

1. In a vending vehicle, the combination with a motorcycle and a third wheel spaced therefrom, a transverse axle supported by the third wheel, longitudinally extending springs carried by the axle, a body, means to support the body from the springs including means connecting one corresponding end of each spring and a pivotal connection between said last named means and the body permitting relative movement in a transverse vertical plane.

2. In a vending vehicle, the combination with a motorcycle and a third wheel spaced therefrom, a transverse axle supported by the third wheel, longitudinally extending springs carried by the axle, a body supported on the springs, a downwardly extending bracket carried between the springs, a second downwardly extending bracket carried by the body, and a pivotal connection between said brackets.

3. In a vehicle, the combination with a plurality of wheels, a transverse axle, a pair of longitudinally extending springs carried by the axle, a body, a downwardly extending generally U-shaped bracket carried by the body, a downwardly extending generally U-shaped bracket carried between the ends of the respective springs and a pivotal connection between the brackets.

4. In a vehicle, the combination with a plurality of wheels, a transverse axle, longitudinally extending springs carried by the axle, a body pivotally connected to the front ends of the springs, and stabilizing devices between the body and the rear ends of the springs comprising a member secured at its ends in spaced relation to the body and bent downwardly from its ends to a substantially horizontal central portion, a member secured at its ends to the rear ends of the respective springs and bent downwardly from its ends to a substantially horizontal central portion, and a pivotal connection between the central portions of said members.

5. In a vending vehicle, the combination with a motorcycle and a third wheel in spaced relation therewith, a body supported between the motorcycle and the last named wheel, a show case telescoping within the body, a show case carried by the body thereabove and extending outwardly from one side toward the motorcycle.

6. In a vending vehicle, the combination with a motorcycle and a third wheel in spaced relation therewith, a body supported between the motorcycle and the last named wheel, a show case telescoping within the rear end of the body and having storage space carried therewith and normally invisible, a show case carried by the body thereabove and overhanging the side adjacent the motorcycle, and devices to compensate for swaying of the vehicle disposed beneath that portion of the body carrying the showcases and operatively connected therewith.

7. In a portable dispensing device adapted for rapid transportation, in combination, a motorcycle element, a rigid axle extending horizontally and transversely from the said element, a third wheel carried by the said rigid axle, longitudinal springs carried by the said axle, a superstructure, transverse means carried by the said springs at one end thereof and a pivotal connection between said transverse means and the superstructure whereby the said superstructure is adapted to maintain its equilibrium upon vertical angular movement of the said axle.

In testimony whereof I affix my signature.

WILLIAM E. CAVADAS.